United States Patent [19]

Yoshida et al.

[11] Patent Number: 5,521,240
[45] Date of Patent: May 28, 1996

[54] PAPER COATING COMPOSITION

[75] Inventors: Yoshifumi Yoshida, Hyogo; Toshiyuki Hasegawa, Osaka; Akira Tanigawa, Osaka; Fujiko Kumei, Osaka; Akira Kawamura, Osaka, all of Japan

[73] Assignee: Sumitomo Chemical Company, Limited, Osaka, Japan

[21] Appl. No.: 473,900

[22] Filed: Jun. 7, 1995

[30] Foreign Application Priority Data

Jul. 1, 1994 [JP] Japan .................................. 6-151222

[51] Int. Cl.$^6$ .......................... C08K 5/20; C08K 5/315
[52] U.S. Cl. .................. 524/217; 524/206; 524/207; 524/226; 524/227; 524/512; 524/538; 524/598
[58] Field of Search .................... 524/512, 598, 524/538, 206, 207, 226, 227, 217; 162/157.3, 157.4, 157.5

[56] References Cited

U.S. PATENT DOCUMENTS

| | | | |
|---|---|---|---|
| 3,503,795 | 3/1970 | Chao et al. | 427/393.1 |
| 3,510,452 | 5/1970 | Frotscher et al. | 427/393.1 |
| 3,860,548 | 1/1975 | Roccheggiam et al. | 524/598 |
| 3,891,589 | 6/1975 | Ray-Chaudhuri | 524/598 |
| 3,953,421 | 4/1976 | Berstein | 524/598 |
| 4,246,153 | 1/1981 | Takagishi et al. | 524/598 |
| 4,444,943 | 4/1984 | Kawakami et al. | 524/598 |
| 4,464,505 | 8/1984 | Kawakami et al. | 524/598 |
| 5,131,951 | 7/1992 | Yoshida et al. | 106/287.25 |
| 5,171,795 | 12/1992 | Miller et al. | 525/430 |

FOREIGN PATENT DOCUMENTS

| | | | |
|---|---|---|---|
| 0081994 | 3/1988 | European Pat. Off. | |
| 63-54402 | 3/1988 | Japan | 524/598 |

*Primary Examiner*—Veronica P. Hoke
*Attorney, Agent, or Firm*—Sughrue, Mion, Zinn, Macpeak & Seas

[57] ABSTRACT

A paper coating composition which comprises:
(I) a pigment;
(II) an aqueous binder;
(III) a mixture or a reaction product of
  a water-soluble resin (A) which can be obtained by reacting, at least, (a) an alkylenediamine or a polyalkylenepolyamine, (b) an urea compound and (c) a compound selected from aldehydes, epihalohydrins and α,γ-dihalo-β-hydrins; and
  an amide compound (B-1) which can be obtained by reacting (x) an α,β-unsaturated carboxylic acid compound and (y) a primary or secondary amino compound, or
  an aminonitrile compound (B-2) which can be obtained by reacting (z) an α,β-unsaturated nitryl compound and (y) a primary or secondary amino compound;
wherein the water-soluble resin of the component (A) may be further allowed to react with a dibasic carboxylic compound, an alicyclic amine and/or an alicyclic epoxy compound in addition to the above three ingredients; and paper coated by using the above composition is especially excellent in ink receptivity and water resistance.

10 Claims, No Drawings

PAPER COATING COMPOSITION

BACKGROUND OF THE INVENTION

The present invention relates to a paper coating composition containing a pigment and an aqueous binder. More particularly it relates to the paper coating composition imparting excellent printing quality and excellent printing results to paper.

The term "paper" as used herein should be interpreted in its broad sense which includes paper in the narrow sense as well as paperboard.

Coated paper, which is obtained by applying a paper coating composition mainly composed of a pigment and an aqueous binder on paper, followed by necessary steps, such as drying and calendering, has been widely used e.g. for commercial prints, magazines and books due to its excellent properties such as printing results. With the increasing demand for higher quality and the development of high-speed printing techniques, constant efforts have been continued to further improve the quality of coated paper. Particularly in the art of offset printing which predominates in various printing techniques, it is an important subject to improve ink receptivity considering the effects of damping water, water resistance such as wet pick, and anti-blister properties at a rotary press.

In order to solve the above-mentioned problem, it has been known to add wet strength agents or printing quality improvers including melamine-formaldehyde resins, urea-formaldehyde resins and polyamidepolyurea-formaldehyde resins such as those disclosed in, for example, JP-B-69-11667 and JP-B-84-32597 (the term "JP-B" as used herein means an "examined published Japanese patent application (KOKOKU)") to the paper coating composition.

Although these conventional wet strength agents and printing quality improvers exhibit effective characteristics, each of them has a serious defect or insufficiency in part of the desired characteristics and is not always satisfactory for practical use.

For example, aminoplast resins such as melamine-formaldehyde resins and urea-formaldehyde resins, not only cause evolution of formaldehyde during the coating process or from the resulting coated paper but also produce substantially no effect on improving ink receptivity and anti-blister properties. Besides, as the pH of the coating composition increases, the water resistance improving effect by the aminoplast resins becomes less pronounced.

Polyamidepolyurea-formaldehyde resins are effective for improving water resistance, ink receptivity and anti-blister properties. The degree of improvements attainable by them, however, is not necessarily sufficient against the recent demand for higher quality of coated paper. Efforts have hence been made for further improvements. For example, improvements are proposed in JP-A-92-00997 and JP-A-92-263696 (the term "JP-A" as used herein means an "unexamined published Japanese patent application (KOKAI)"). Nevertheless, there still has been need for further improved performance to cope with the ever increasing demand for coated paper quality.

An object of the present invention is to provide a paper coating composition which can cope with the demand and gives coated paper higher qualities such as higher water resistance and ink receptivity than those obtainable by conventional techniques.

The present inventors have conducted extensive investigation; as a result, have found that a paper coating composition containing a mixture or a reaction product of a specific water-soluble resin and a specific amide or aminonitrile compound can give excellent properties to paper; and have thus attained the present invention.

SUMMARY OF THE INVENTION

The present invention provides a paper coating composition which comprises:

(I) a pigment;
(II) an aqueous binder;
(III) a mixture or a reaction product of
    a water-soluble resin (A) which can be obtained by reacting, at least, (a) an alkylenediamine or a polyalkylenepolyamine, (b) an urea compound and (c) a compound selected from aldehydes, epihalohydrins and $\alpha,\gamma$-dihalo-$\beta$-hydrins; and
    an amide compound (B-1) which can be obtained by reacting (x) an $\alpha,\beta$-unsaturated carboxylic acid compound and (y) a primary or secondary amino compound, or
    an aminonitrile compound (B-2) which can be obtained by reacting (z) an $\alpha,\beta$-unsaturated nitrile compound and (y) a primary or secondary amino compound.

DETAILED DESCRIPTION OF THE INVENTION

Pigments which have been commonly used for paper coating can be used as component (I) in the present invention. Examples of the pigments include white inorganic pigments such as kaolin, talc, calcium carbonate (either ground or precipitated), aluminum hydroxide, satin white and titanium oxide; and white organic synthetic pigments such as polystyrene, melamine-formaldehyde resins and urea-formaldehyde resins. They may be used either individually or in combination of two or more thereof. Organic or inorganic colored pigments may also be used in combination.

Aqueous binders which have been commonly used for paper coating can be used as component (II) in the present invention. Examples of the binders include water-soluble binders and aqueous emulsion type binders. Examples of the water-soluble binders include modified or unmodified starches such as oxidized starch and phosphate-esterified starch, polyvinyl alcohol, water-soluble proteins such as casein and gelatin, and modified cellulose such as carboxymethyl-cellulose. Examples of the aqueous emulsion type binders include styrene-butadiene type resins, vinyl acetate resins, ethylene-vinyl acetate resins and methyl methacrylate resins. These aqueous binders may be used either individually or in combination of two or more thereof.

The ingredient (III) of the present invention is a mixture or a reaction product of a water-soluble resin (A) and an amide compound (B-1) or an aminonitrile compound (B-2), i.e., a mixture of (A) and (B-1), a reaction product of (A) and (B-1), a mixture of (A) and (B-2) or a reaction product of (A) and (B-2).

The water-soluble resin (A) can be obtained by reacting, at least, (a) an alkylenediamine or a polyalkylenepolyamine, (b) an urea compound and (c) a compound selected from aldehydes, epihalohydrins and $\alpha,\gamma$-dihalo-$\beta$-hydrins.

When the ingredient (III) is a reaction product of a water-soluble resin (A) and an amide compound (B-1) or an aminonitrile compound (B-2), the water-soluble resin (A) may be produced any time until it reacts with (B-1) or (B-2). For example, (A) can be produced before it is charged to the reaction system and reacted with (B-1) or (B-2); or it can be produced after charged to the reaction system, i.e., it can be produced in the reaction system while the reaction of (A) and (B-1) or (B-2) is proceeding. In the latter case, the water-soluble resin (A) may be produced by conducting a reaction of (a) and (b) at first in the absence of (c) or in the presence of only a part of (c) and, thereafter, conducting a reaction of the reaction product with remaining (c) by adding the remaining (c) and (B-1) or (B-2) to the reaction system.

Examples of the alkylenediamine or polyalkylene polyamine (a), which is one of the starting materials for the water-soluble resin (A) include aliphatic diamines such as ethylenediamine, 1,2-propanediamine, 1,3-propanediamine and hexamethylene diamine; and polyalkylene polyamines such as diethylene-triamine, triethylene tetramine, tetraethylene pentamine, iminobispropylamine, 3-azahexane-1,6-diamine and 4,7-diaza-decane-1,10-diamine. Among them, diethylenetriamine and triethylenetetramine are preferred from the industrial viewpoint. These alkylenediamines or polyalkylene polyamine (a) can be used either individually or in combination of two or more thereof.

Examples of the urea compound (b), which is also a starting material for the water-soluble resin (A) used in the present invention, include urea, thiourea, guanylurea, methylurea and dimethylurea. These (b) urea compounds can be used either individually or in combination of two or more thereof. Among the urea compound (b), urea is preferred from the industrial viewpoint. The amount of the urea compound (b) is 0.3–1 mole, preferably 0.5–1 mole per 1 mole of amino group of the alkylenediamine or polyalkylene polyamine (a).

Examples of aldehydes which can be used as a starting material (c) for the water-soluble resin (A), include formaldehyde; alkylaldehydes such as acetaldehyde and propylaldehyde; glyoxal; and alkyldialdehydes such as propanedial and butanedial. Formaldehyde and glyoxal are preferred from the industrial view point. These aldehydes can be used either individually or in combination of two or more thereof.

The epihalohydrins which can be used as a starting material (c) for the water-soluble resin (A) are represented by the following formula:

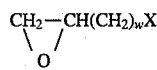

wherein X represents a halogen atom, and w is 1, 2 or 3. Preferred examples of the epihalohydrins include epichlorohydrin and epibromohydrin. These epihalohydrins can be used either individually or in combination of two or more thereof.

The α,γ-dihalo-β-hydrins which can be used as a starting material (c) for the water-soluble resin (A) are represented by the following formula:

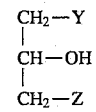

wherein Y and Z each independently represent a halogen atom.

As an example of the α,γ-dihalo-β-hydrin, 1,3-dichloro-2-propanol can be mentioned. These α,γ-dihalo-β-hydrins can be used either individually or in combination of two or more thereof.

The above mentioned aldehydes, epihalohydrins and α,γ-dihalo-β-hydrins can be used either alone or in combination of two or more of them. For example, the aldehyde and the epihalohydrin may be used simultaneously, and the aldehyde, the epihalohydrin and the α,γ-dihalo-β-hydrin may be used simultaneously.

The amount of (c) a compound selected from aldehydes, epihalohydrins and α,γ-dihalo-β-hydrins is 0.1–2 mole, preferably 0.1–1 mole per 1 mole of (a) alkylenediamine or polyalkylenepolyamine.

The water-soluble resin (A) may be a resin prepared by reacting (a),(b),(c) and one or more additional ingredients such as (d) a dibasic carboxylic acid compound and (e) an alicyclic compound selected from an alicyclic amine having at least one active hydrogen atom and an epoxy compound.

The dibasic carboxylic acid compound (d) is a compound having two carboxylic groups or a derivative thereof. The dibasic carboxylic acid compounds (d) include not only free acids thereof but also esters and acid anhydrides thereof and the like. The dibasic carboxylic acid compound (d) may be an aliphatic, aromatic or alicyclic compound. As examples of the free acid, an aliphatic dicarboxylic acid such as succinic acid, glutaric acid, adipic acid, sebacic acid, maleic acid and fumaric acid; an aromatic dicarboxylic acid such as phthalic acid, isophthalic acid and terephthalic acid; and an alicyclic dicarboxylic acid such as tetrahydrophthalic acid, hexahydrophthalic acid, cyclohexane-3-dicarboxylic acid, cyclohexane-1,4-dicarboxylic acid, cyclopentanedicarboxylic acid, 3-methyltetrahydrophthalic acid, 4-methyltetrahydrophthalic acid, 3-methyl hexahydrophthalic acid, 4-methyl hexahydrophthalic acid and endomethylene tetrahydrophthalic acid can be referred to. In this specification, if the alicyclic compound has an unsaturated bond and the position of the unsaturated bond is not mentioned, the alicyclic compound includes any of the compound having the unsaturated bond at any position.

When the dibasic carboxylicacid compound (d) is an aliphatic compound, the compound having 4 to about 36 carbon atoms is usually used.

As examples of the ester of the dibasic carboxylic acid (d), its mono- and diester with a lower alcohol and its polyester with a glycol can be referred to.

Examples of the acid anhydride include succinic anhydride, phthalic anhydride, tetrahydrophthalic anhydride, hexahydrophthalic anhydride, 3-methyltetrahydrophthalic anhydride, 4-methyltetrahydrophthalic anhydride, 3-methylhexahydrophthalic anhydride, 4-methylhexahydrophthalic anhydride and endomethylenetetrahydrophthalic anhydride.

As the dibasic carboxylic acid compound (d), a polyester which is a reaction product of a dibasic carboxylic acid and a glycol may be used. Among the polyester, preferable is the polyester having a free carboxylic acid group. Examples of the glycol used for producing the polyester include alkylene glycol such as ethyleneglycol, propyleneglycol and butanediol; cycloalkylene glycol such as cyclopentanediol and cyclohexanediol; alkenylene glycol such as butenediol and octenediol; polyalkylene glycol such as diethyleneglycol, dipropyleneglycol, triethyleneglycol, polyethylenglycol and polytetramethylenglycol; addition compound of bisphenol A and ethylene oxide; and addition compound of hydrogenated bisphenol A and ethylene oxide. A polyester having carboxylic acid groups at the ends of its molecular chain can be obtained by reacting a dibasic carboxylic acid and the glycol using an excess in mole of the dibasic carboxylic acid. The dibasic carboxylic acid compound (d) can be used individually or in combination of two or more.

Amount of the dibasic carboxylic acid compound (d) is 1 mole or less, preferably 0.5 mole or less per 1 mole of the alkylenediamine or polyalkylenepolyamine (a).

Alicyclic amines having at least one active hydrogen atom used as an alicyclic compound (e), usually have an alicyclic ring having about 5 to about 12 carbon atoms, preferably a cyclohexane ring, and have at least one primary or secondary amino group. The amino group may be linked to the alicyclic ring either directly or through a connecting group such as alkylene. Example of the alicyclic amine having at least one active hydrogen atom include cyclohexyl amine, dicyclohexyl amine, N-methylcyclohexyl amine, 1,3-diaminocyclohexane, 1,4-diaminocyclohexane, 4,4'-diamino-3,3'-dimethyldicyclohexylmethane, 4,4'-diamino-3,3'-dimethylbicyclohexane, isophoronediamine, 1,3-bis(aminomethyl)cyclohexane, 1,2-bis(aminomethyl)cyclohexane, 1,4-bis(aminomethyl)cyclohexane, N-aminopropylcyclohexylamine, 1,5-bis(aminomethyl)octahydro-4,7-methanoindene, 2,6-bis(aminomethyl) octahydro-4,7-methanoindene, 2,2-bis(4-aminocyclohexyl) propane, bis(4-aminocyclohexyl) methane, 4,4'-oxybis(cyclohexylamine), 4,4'-sulfonbis(cyclohexylamine), 1,3,5-triaminocyclohexane, 2,4'-diamino-3,3',5,5'-tetramethyl dicyclohexylmethane, 4,4'-diamino-3,3',5,5'-tetramethyl dicyclohexylmethane, methanediamine, N-methyl-1,3-diaminocyclohexane, N,N-dimethyl- 1,3-diaminocyclohexane, 3-N-methylamino-3,5,5-trimethyl cyclohexylamine and N,N-dimethyl bis(4-aminocyclohexyl) methane. The alicyclic amine can be used either individually or in combination of two or more.

Alicyclic epoxy compounds used as an alicyclic compound (e) usually have an alicyclic ring having about 5 to about 2 carbon atoms, preferably a cyclohexane ring, and have an epoxy group linked to the alicyclic ring either directly or indirectly. ("Indirectly" means "linked to the alicyclic ring through a connecting group". Glycidyl group can be mentioned as an example.)

Examples of the alicyclic epoxy compound include cyclohexene oxide, vinyl cyclohexene dioxide, bis(3,4-epoxycyclohexyl)adipate, 3,4-epoxycyclohexylmethyl-3,4-epoxycyclohexenecarboxylate, 3-(3,4-epoxycyclohexyl)-8,9-epoxy-2,4-dioxaspiro[5,5]undecane, diglycidyl, hexahydrophthalate and 2,2-bis(4-glycidyloxycyclohexyl) propane. The alicyclic epoxy compound can be used either individually or in combination of two or more. The alicyclic amine and the alicyclic epoxy compound can be used in combination.

The amount of the alicyclic compound (e) is 1 mole or less, preferably 0.5 mole or less per 1 mole of the alkylenediamine or polyalkylenepolyamine (a).

One of preferable alkali soluble compounds (A) can be obtained by reacting (a) an alkylenediamine or a polyalkylenepolyamine, (b) an urea compound, (c) a compound selected from aldehydes, epihalohydrins and α,γ-dihalo-β-hydrins and, if desired, (e) an alicyclic compound selected from an alicyclic amines having at least one active hydrogen atom and an epoxy compound. In the reaction to obtain the above-mentioned preferred alkali soluble compound (A), the reaction order among (a), (b) and (c), and (e), is not critical. As an example of the reaction order, following can be mentioned.

An alkylenediamine or a polyalkylene polyamine (a) and an urea compound (b) are subjected to a deammoniation reaction(hereinafter referred to as reaction 1), followed by reaction of the reaction product with (c) a compound selected from aldehydes, epihalohydrins and α,γ-dihalo-β-hydrins(hereinafter the reaction following the reaction 1 will be referred to as reaction 2). In the case that the alicyclic compounds (e) is also used as a starting material of the reaction, (e) may be reacted with other starting material, i.e. (a), (b) or (c), during the reaction 1 and/or 2.

In the reaction 1, the urea compound (b) may be added at one time to react with (a). Two step reaction in which a part of (b) is added to react with (a) at first, followed by adding remaining (b) to conduct deammoniation reaction is also possible. In the case that an aldehyde is used as (c), it is preferred to conduct reaction 2 under an acidic condition or it is also preferred to conduct the reaction 2 under an alkaline condition at first, followed by reaction under an acidic condition. In the case that an epihalohydrin and/or an α,γ-dihalo-β-hydrinsaldehyde are used as (c), it is preferred to conduct reaction 2 under an weakly acidic or an alkaline condition, for example at pH 5 or higher, more preferred at pH 6–9.

In case when the water-soluble resin (A) is reacted with (B-1) or (B-2) to produce a reaction product, as examples of the manner of reaction 2, following can be mentioned:

(1) whole of (c) is charged to the reaction system obtained by reaction 1 to conduct reaction 2 and, after completion of the reaction 2, (B-1) or (B-2) are reacted with the reaction product;

(2) whole of (c) together with (B-1) or (B-2) is charged to the reaction system obtained by reaction 1 simultaneously to conduct reaction 2; and (3) a part of (c) is charged to the reaction system obtained by reaction 1 to conduct reaction 2 and, thereafter, remaining (c) and (B-1) or (B-2) are charged to the reaction system thus obtained to conduct the reaction 2 further.

These reactions 1 and 2 can be conducted according to known manners. For example, the reaction using (a), (b) and (c) as the starting materials is mentioned in JP-A-92-100997, and the reaction using (e) as a starting material in addition to (a),(b) and (c) is mentioned in JP-A-92-263696 and JP-A-92-333697.

Another preferable alkali soluble compounds (A) can be obtained by reacting (a) an alkylenediamine or a polyalkylenepolyamine, (b) an urea compound, (c) a compound selected from aldehydes, epihalohydrins and α,γ-dihalo-β-hydrins, (d) a dibasic carboxylicacid compound and, if desired (e) an alicyclic compound selected from an alicyclic amines having at least one active hydrogen atom and an epoxy compound. In the reaction to obtain the above-mentioned preferred alkali soluble compound (A), the reaction order among (a), (b), (c), (d) and (e) is not critical. As an example of the reaction order, following can be mentioned.

An alkylenediamine or a polyalkylene polyamine (a), an urea compound (b) and a dibasic carboxylicacid compound (d) are subjected to a deammoniation reaction and dehydration (any reaction order among (a), (b) and (d) are employed; hereinafter this reaction is referred to as reaction 3) to produce a polyamidepolyurea, followed by a reaction of the polyamidepolyurea with (c) a compound selected from aldehydes, epihalohydrins and α,γ-dihalo-β-hydrins(hereinafter the reaction following the reaction 3 will be referred to as reaction 4). In the case when the alicyclic compounds (e) is also used as a starting material of the reaction, (e) can be reacted with other starting materials, i.e. (a), (b), (c) or (d), during the reaction 3 and/or the reaction 4.

As examples of the manner to conduct the reaction 3, following can be mentioned:

(1) the urea compound (b) is added at one time to be subjected to the reaction;

(2) a part of (b) is added at first to to conduct deammoniation reaction, followed by adding remaining (b) to conduct deammoniation reaction again;

(3) dehydration between (a) and (d) is conducted at first, followed by deammoniation with (b);

(4) a part of (b) is subjected to a deammoniation reaction with (a) and, thereafter, the reaction product is subjected to a dehydration with (d), followed by a deammoniation reaction with remaining (b); and (5) (a), (d) and a part of (b) are subjected to dehydration and deammoniation simultaneously, followed by a deammoniation with remaining (b).

In the case that an aldehyde is used as (c), it is preferred to conduct reaction 4 under an acidic condition or it is also preferred to conduct reaction 4 under an alkaline condition at first, followed by reaction 4 under an acidic condition. When an epihalohydrin and/or an $\alpha,\gamma$-dihalo-$\beta$-hydrinsaldehyde are used as (c), it is preferred to conduct reaction 4 under a weakly acidic or an alkaline condition, for example at pH 5 or higher, more preferred at pH 6–9.

In the case that the water-soluble resin (A) is reacted with (B-1) or (B-2) to produce a reaction product, as examples of the manner of reaction 4, following can be mentioned:

(1) whole of (c) is charged to the reaction system obtained by reaction 3 to conduct reaction 4 and, after completion of reaction 4, (B-1) or (B-2) are reacted with the reaction product of reaction 4;

(2) whole of (c) together with (B-1) or (B-2) is charged to the reaction system obtained by reaction 3 simultaneously to conduct reaction 4; and (3) a part of (c) is charged to the reaction system obtained by reaction 3 to conduct reaction 4 and, thereafter, (c) and (B-1) or (B-2) are charged together to the reaction system thus obtained to conduct reaction 4 further.

These reactions 3 and 4 can be conducted according to known manners. For example, the reaction using (a), (b), (c) and (d) as the starting materials is mentioned in JP-A-80-31837, JP-A-82-167315, JP-A-87-104995, JP-A-87-125092, JP-A-87-125093, etc., and the reaction using (e) as a starting material in addition to (a), (b), (c) and (d) is mentioned in JP-A-90-216297 and JP-A-90-221498.

As (x) an $\alpha,\beta$-unsaturated carboxylic acid compound, which is a starting material for (B-1), a free acid thereof, an ester thereof and an acid anhydride thereof can be used. Examples of the compound include acrylic acid, methacrylic acid, methyl acrylate, methyl methacrylate, ethyl acrylate, ethyl methacrylate, butyl acrylate, butyl methacrylate, itaconic acid, itaconic acid anhydride, crotonic acid and methyl crotonate.

As (y) a primary or secondary amino compound, which has a primary or secondary amino group and is a starting material for (B-1) and (B-2), preferred is the one having 4 or more carbon atoms and more preferred is the one having 4 or more carbon atoms and 2 or more amino groups. In the case that (y) has 2 or more amino groups, the one having a tertiary amino group, in addition to the primary or secondary amino group, is also preferred.

As examples of (y), amino compounds which are mentioned above as examples of (a) a water soluble resin or as examples of (e) an alicyclic amine can be mentioned. In addition, examples of (y) include monoamines such as butylamine, pentylamine, hexylamine, heptylamine, cyclohexyl amine, 2-ethylcyclohexyl amine, octylamine, bebzylamine, diisopropylamine, dicyclohexyl amine, N-methylcyclohexyl amine and N-methylbenzyl amine; diamines such as N-ethyl ethylenediamine, N,N-dimethyl-1,3-propanediamine, N-methyl hexamethylenediamine, 2,4,4-trimethyl hexamethylene diamine and xylilenediamine; and polyamines such as N-ethyl iminobisethylamine, N-methylimino bispropylamine and N,N-dimethyl aminoethylethylene diamine.

The amide compound (B-1) can be obtained by reacting (x) and (y) at 100°–250° C., preferably at 130°–200° C., for 2–20 hours while removing water and alcohol produced in the reaction from the reaction system. The amide compound (B-1) can also be obtained preferably by reacting (x) and (y) at 10°–80° C. for 1–5 hours, followed by reacting them further at 100°–250° C. for 2–15 hours while removing water and alcohol from the reaction system. For the reaction, acid catalyst such as sulfuric acid and phosphoric acid may be used.

The amount of (x) is preferably about 0.2–0.5 mole per 1 mole of amino group of (y) the primary or secondary amino compound.

Preferably, viscosity of 70% aqueous solution of the amide compound (B-1) is 1–1000 ps and more preferably, it is 5–500 ps.

As examples of (z) an $\alpha,\beta$-unsaturated nitrile compound, which is a starting material for (B-2), acrylonitrile and methacrylonitrile can be mentioned.

The aminonitrile compound (B-2) can be obtained by reacting (z) and (y) at 0°–100° C., preferably at 20°–80° C., for 1–10 hours in the absence or presence of a reaction solvent.

The amount of (z) is preferably about 0.2–2.0 mole, more preferably 0.5–1.0 mole per 1 mole of active hydrogen of (y) the primary or secondary amino compound.

As mentioned above, the ingredient (III) of the present invention is a mixture or a reaction product of (A) and (B-1) or (B-2). The reaction product of (A) and (B-1) can be obtained by reacting (A) and (B-1) at 20°–100° C. for 1–10 hours. The reaction product of (A) and (B-2) can be obtained by reacting (A) and (B-2) at 20-100° C for 1–10 hours. If the ingredient (III) of the present invention is a mixture of (A) and (B-1) or (B-2), the amount of (B-1) or (B-2) in the mixture is preferably from 1 to 90% by weight, more preferably from 3 to 80% by weight, based on the solid content of the ingredient (III).

The ratio of amounts of the pigment (I) to the aqueous binder (E) in the paper coating composition of the present invention is determined in accordance with the aim of the usage. However, this is not particularly different to the ratio in a conventional the paper coating composition. Usually, aqueous binder (II) is used preferably in an amount of from 5 to 200 parts by weight, more preferably from 10 to 50 parts by weight, per 100 parts by weight of pigment (I). The ingredient (III) is used preferably in an amount of from 0.05 to 5 parts by weight, more preferably from 0.1 to 2 parts by weight, calculated as the solid content, per 100 parts by weight of pigment (I).

For formulating the paper coating composition of the present invention, the mixing order among (I), (II) and (III) is not critical, and as examples of the order in the case when the ingredient (III) is a mixture, following can be mentioned:

(1) after mixing (A) and (B), the resulting mixture is mixed with (I) and (II);

(2) (A) and (B) are mixed with (I) and (II) individually (=without mixing (A) and (B) previously); and (3) one of (A) and (B) is mixed with (I) and other one is mixed with (II), and the resulting mixtures are mixed.

If desired, the paper coating composition of the present invention may further contain other components, such as dispersing agents, viscosity or fluidity regulators, defoaming agents, antiseptics, lubricants, water retaining agents, and colorants including dyes and colored pigments.

The paper coating composition of the present invention can be applied on a paper substrate by any of known coating means such as blade coater, air knife coater, bar coater, size press coater, gate roll coater, and cast coater. After coating, the paper is subjected to drying and a surface smoothening treatment by a supercalender, etc., if desired, to obtain a coated paper.

By using (B-1) and (B-2) in addition to (I), (II), (III) and (A), coated papers having improved properties can be obtained comparing to those obtained without using (B-1) and (B-2).

PREFERRED EMBODIMENT

The present invention is now illustrated in detail with reference to Examples which should not be construed to limit the scope of the present invention. All the percents, parts and ratios are by weight unless otherwise indicated. In the Examples, viscosities and pH were measured at 25° C.

Synthesis Example 1

In a four-necked flask equipped with a thermometer, a reflux condenser and a stirring rod, 146.2 g (1.0 mol) of triethylenetetramine and 30.0 g (0.5 mol) of urea were charged, and the mixture was heated at an inner temperature of 140°–160° C. for 3.5 hours to effect deammoniation. Thereafter, 73.1 g (0.5 mol) of adipic acid was charged thereto and dehydrate-amidation was conducted for 5 hours while keeping the inner temperature at 150°–160° C. Then the inner temperature was lowered to 130° C., 120.1 g (2.0 mol) of urea was charged thereto and deammoniation was conducted for 2 hours at an inner temperature of 120°–130° C. Thereafter, 270 g of water was added thereto to prepare an aqueous resin solution. To the resin solution, 60.9 g (0.75 mol) of 37% formalin was added. The resulting solution was adjusted to pH 4–5 with 70% sulfuric acid and was allowed to react at an inner temperature of 70° C. for 4 hours. The resulting solution was then adjusted pH 4–5 with an aqueous sodium hydroxide solution and was allowed to react at an inner temperature of 70° C. for 4 hours. Thereafter, the resulting solution was adjusted to pH 6.5 and a concentration of 50% with an aqueous sodium hydroxide solution to obtain 675 g of an aqueous water-soluble resin solution having a viscosity of 140 cps.

Synthesis Example 2

In the same apparatus as used in Synthesis Example 1, 58.5 g (0.4 mol) of triethylenetetramine and 12.0 g (0.2 mol) of urea were charged, and the mixture was heated at an inner temperature of 120°–140 ° C. for 3 hours to effect deammoniation. Thereafter, 34.4 g (0.2 mol) of hexahydrophthalic acid was charged thereto and dehydrate-amidation was conducted for 5 hours at an inner temperature of 150°–160° C. Then the inner temperature was lowered to 130° C., 48.0 g (0.8 mol) of urea was charged thereto and deammoniation was conducted for 2 hours at an inner temperature of 120°–130° C. After completion of the reaction, the inner temperature was lowered to 100 T and 108 g of water was added thereto to prepare an aqueous resin solution. To the resin solution, 32.4 g (0.4 mol) of 37% formalin was added, and the resulting solution was adjusted to pH 5.1 with 70% sulfuric acid. After elevating the inner temperature to 60° C., the resulting solution was allowed to react for 5 hours, and then cooled. Thereafter, the resulting system was neutralized with 28% an aqueous sodium hydroxide solution to obtain 275 g of an aqueous water-soluble resin solution having a viscosity of 45 cps, pH of 7.1 and a concentration of 50%

Synthesis Example 3

In the same apparatus as used in Synthesis Example 1, 146.2 g (1.0 mol) of triethylenetetramine and 180. 2 g (3.0 mol) of urea were charged, and the mixture was heated at an inner temperature of 120°–140° C. for 2 hours to effect deammoniation. Thereafter, 150 g of water was added thereto to prepare an aqueous resin solution. To the resin solution, 48.7 g (0.6 mol) of 37% formalin was added, and the resulting solution was allowed to react for 4 hours at an inner temperature of 70° C. Then the resulting solution was adjusted to pH 4.0 with 70% sulfuric acid, and the reaction system was allowed to react for 4 hours while keeping the inner temperature at 70° C. Thereafter, the resulting solution was adjusted to pH 7.0 with an aqueous sodium hydroxide solution to obtain 506 g of an aqueous water-soluble resin solution having a viscosity of 210 cps and a concentration of 60%.

Synthesis Example 4

In a four-necked flask equipped with a thermometer, a reflux condenser and a stirring rod, 146.2 g (1.0 mol) of triethylenetetramine and 30.0 g (0.5 mol) of urea were charged, and the mixture was heated at an inner temperature of 150°–160° C. for 5 hours to effect deammoniation. Thereafter, 73.1 g (0.5 mol) of adipic acid was charged thereto and dehydrate-amidation was conducted for 5 hours while keeping the inner temperature at 150°–160° C. Then the inner temperature was lowered to 130° C., 120.1 g (2.0 mol) of urea was charged thereto and deammoniation was conducted for 2 hours at an inner temperature of 120°–130° C. Thereafter, 270 g of water was added thereto to prepare an aqueous resin solution. To the resin solution, 60.9 g (0.75 mol) of 37% formalin was added. The resulting solution was adjusted to pH 4–5 with sulfuric acid and was allowed to react at an inner temperature of 70° C. for 4 hours. Thereafter, the resulting solution was adjusted to pH 6.5 and a concentration of 50% with an aqueous sodium hydroxide solution to obtain 675 g of an aqueous water-soluble resin solution having a viscosity of 140 cps.

Synthesis Example 5

In the same apparatus as used in Synthesis Example 1, 146.2 g (1.0 mol) of triethylenetetramine and 30.0 g (0.5 mol) of urea were charged, and the mixture was heated at an inner temperature of 120°–140° C. for 3 hours to effect deammoniation. Thereafter, 77.1 g (0.5 mol) of hexahydrophthalic acid was charged thereto and dehydrate-amidation was conducted for 5 hours at an inner temperature of 150°–160° C. Then the inner temperature was lowered to 130° C., 120.1 g (2.0 mol) of urea was charged thereto and deammoniation was conducted for 2 hours at an inner temperature of 120°–130° C. After completion of the reaction, the inner temperature was lowered to 100° C. and 270 g of water was added thereto to prepare an aqueous resin solution. To the resin solution, 81.2 g (1.0 mol) of 37% formalin was added, and the resulting solution was adjusted to pH 5 with sulfuric acid. After elevating the inner temperature to 60° C., the reaction system was allowed to react for 5 hours, and then cooled. Thereafter, the resulting solution was neutralized with an aqueous sodium hydroxide solution to obtain 688 g of an aqueous water-soluble resin solution having a viscosity of 45 cps, pH of 7 and a concentration of 50%

Synthesis Example 6

In the same apparatus as used in Synthesis Example 1, 146.2 g (1.0 mol) of triethylenetetramine and 180.2 g (3.0 mol) of urea were charged, and the mixture was heated at an inner temperature of 120°–140° C. for 2 hours to effect deammoniation. Thereafter, 150 g of water was added thereto to prepare an aqueous resin solution. To the resin solution, 48.7 g (0.6 mol) of 37% formalin was added, and the resulting system was allowed to react for 4 hours at 70° C. Thereafter, the resulting solution was adjusted to pH 4.0 with sulfuric acid, allowed to react for 4 hours while keeping the inner temperature at 70° C., and, then, was adjusted to pH 7 with aqueous sodium hydroxide solution to obtain 506 g of an aqueous water-soluble resin solution having a viscosity of 210 cps and a concentration of 60%

Synthesis Example 7

In the same apparatus as used in Synthesis Example 1, 146.2 g (1.0 mol) of triethylenetetramine, 48.6 g (0.25 mole) of octahydro-4,7-methanoindene-1(2),5(6)-dimethanamine, 24.5 g (0.25 mole) of cyclohexeneoxide and 60.1 g (1.0 mol) of urea were charged, and the mixture was heated at an inner temperature of 150° C. for 2 hours to effect deammoniation. Then, 120.1 g (2.0 mol) of urea were charged and deammoniation was further conducted for 4 hours at 120° C. Thereafter, water was added thereto to prepare a 70% aqueous solution. To the solution, 60.9 g (0.75 mol) of 37% formalin was added. The resulting solution was adjusted to pH 5 with sulfuric acid and was kept for 2 hours at 70° C. while agitating the solution. Then, the resulting solution was adjusted to pH 7 with aqueous ammonia solution to obtain 553 g of an aqueous water-soluble resin solution having a viscosity of 310 cps and a concentration of 60%

Synthesis Example 8

In a four-necked flask equipped with a thermometer, a Liebig condenser and a stirring rod, 232 g (2.0 mol) of hexamethylenediamine was charged and 150 g (1.5 mole) of methyl methacrylate was added dropwise over 1 hour while keeping the inner temperature at 40°–50° C. Thereafter, the reaction system was allowed to react for 1 hour at 60°–70° C. and, then, to react for 5 more hours at 120°–150° C. while distiling methanol off. After completion of the reaction, water was added thereto to obtain 478 g of an amide compound solution having a viscosity of 74 ps and a concentration of 70%.

Synthesis Example 9

In the same apparatus as used in Synthesis Example 8, 204 g (2.0 mol) of N,N-dimethyl-1,3-propanediamine and 86 g (1.0 mole) of methylacrylate were charged and reaction was conducted for 5 hours while keeping inner temperature at 100°–130° C. and distiling methanol off. After completion of the reaction, water was added thereto to obtain 389 g of an amide compound solution having a viscosity of 7.3 poise and a concentration of 70%.

Synthesis Example 10

In the same apparatus as used in Synthesis Example 8, 284 g (2.0 mol) of 1,3-bisaminomethylcyclohexane was charged and 103 g (1.2 mole) of methacrylic acid was added dropwise over 1 hour. Thereafter, reaction was conducted for 1 hour at 40°–50° C. and, after inner temperature was elevated to 120°–150° C., reaction was conducted for 5 more hours while distiling water off. After completion of the reaction, 179 g of water was added and the reaction system was cooled to 70° C., 50 g (0.5 mole) of methyl methacrylate was added thereto and reaction was conducted for 2 hours at 60°–70° C. to obtain 598 g of an amide compound solution having a viscosity of 130 ps and a concentration of 70%.

Synthesis Example 11

In the same apparatus as used in Synthesis Example 8, 341 g (2.0 mol) of isophoronediamine was charged and, thereto, 95 g (1.1 mole) of methyl acrylate was added dropwise over 1 hour while keeping inner temperature at 30°–40° C. Thereafter, reaction was conducted for 1 hour at 40°–50° C. and, after inner temperature was elevated to 120°–150° C., reaction was conducted for 5 more hours while distiling methanol off. After completion of the reaction, water was added to obtain 573 g of an amide compound solution having a viscosity of 22 ps and a concentration of 70%.

Synthesis Example 12

In the same apparatus as used in Synthesis Example 8, 272 g (2.0 mol) of xylilenediamine was charged and 72 g (1.0 mole) of acrylic acid was added thereto. Thereafter, reaction was conducted for 5 hours while keeping inner temperature at 120°–150° C. and distiling water off. After completion of the reaction, 158 g of water was added and the reaction system was cooled to 70° C. Then, 43 g (0.5 mole) of methyl acrylate was added thereto and reaction was conducted for 2 hours at 60°–70° C. to obtain 527 g of an amide compound solution having a viscosity of 180 ps and a concentration of 70%.

Synthesis Example 13

In the same apparatus as used in Synthesis Example 8, 99 g (1.0 mol) of cyclohexylamine and 103 g (1.0 mol) of diethylenetriamine were charged and, thereto, 112 g (1.3 mole) of methyl acrylate was added dropwise over 1 hour. Thereafter, reaction was conducted for 1 hour at 40°–50° C. and, after inner temperature was elevated to 100°–130° C., reaction was conducted for 5 more hours while distiling methanol off. After completion of the reaction, water was added to obtain 432 g of an amide compound solution having a viscosity of 18 ps and a concentration of 70%.

Synthesis Example 14

In the same apparatus as used in Synthesis Example 1, 375 g of aqueous water soluble resin solution obtained according to the same manner as in Synthesis Example 1, 89 g of amide compound solution obtained according to the same manner as in Synthesis Example 8 and 36 g of water were charged and reaction was conducted for 2 hours at 60°–70° C. to obtain a resin solution having a viscosity of 200 cps and a concentration of 50%.

Synthesis Example 15

In the same apparatus as used in Synthesis Example 14, 333 g of aqueous water soluble resin solution obtained according to the same manner as in Reference Example 3, 71 g of amide compound solution obtained according to the same manner as Synthesis Example 10 and 12 g of water were charged and reaction was conducted according to the same condition as to Synthesis Example 14 to obtain a resin solution having a viscosity of 330 cps and a concentration of 60%.

Synthesis Example 16

In the same apparatus as used in Synthesis Example 1, 350 g of aqueous water soluble resin solution obtained according to the same manner as in Synthesis Example 2, 107 g of amide compound solution obtained according to the same manner as in Synthesis Example 12, 4 g of 37% formalin and 40 g of water were charged. After the mixture was adjusted at pH 5 with sulfuric acid, reaction was conducted for 4 hours at 60°–70° C. to obtain a resin solution having a viscosity of 58 cps and a concentration of 50%.

Synthesis Example 17

In the same apparatus as used in Synthesis Example 1, 253 g of aqueous water soluble resin solution obtained according to the same manner as in Synthesis Example 3, 12 g of amide compound solution obtained according to the same manner as in Synthesis Example 11, 8 g of 37% formalin 50 g of water were charged. After the mixture was adjusted at pH 5 with sulfuric acid, reaction was conducted for 4 hours at 60°–70° C. to obtain a resin solution having viscosity of 110 cps and a concentration of 50%.

Synthesis Example 18

In the same apparatus as used in Synthesis Example 1, 154.8 g (1.0 mol) of diethylenetriamine and 203 g of water were charged and, thereto, 318.4 g (6 mole) of acrylonitrile was added dropwise over 2 hour while keeping inner temperature at 40°–50° C. Thereafter, reaction was conducted for 4 hours at 70°–80° C. to obtain 676 g of a 70% aqueous solution of an aminonitrile compound.

Synthesis Example 19–24

Synthesis Example 18 was repeated except that amine, nitrile and molar ratio of nitrile were changed as described in Table 1 to obtain a 70% aqueous solution of an aminonitrile compound.

TABLE 1

| Synthesis Example No. | Amine | Nitrile | mole ratio * |
|---|---|---|---|
| 18 | diethylene-triamine | acrylonitrile | 0.8 |

TABLE 1-continued

| Synthesis Example No. | Amine | Nitrile | mole ratio * |
|---|---|---|---|
| 19 | ethylenediamine | meth-acrylonitrile | 0.5 |
| 20 | hexamethylene-diamine | acrylonitrile | 0.5 |
| 21 | isophorone-diamine | acrylonitrile | 0.4 |
| 22 | xylilene-diamine | acrylonitrile | 0.4 |
| 23 | N,N-dimethyl-1,3-propanediamine | acrylonitrile | 0.6 |
| 24 | cyclohexylamine | acrylonitrile | 0.6 |

* mole ratio of Nitrile to active hydrogen of Amine.

Synthesis Example 25

In the same apparatus as used in Synthesis Example 4, 450 g of aqueous water soluble resin solution obtained according to the same manner as in Synthesis Example 4 and 36 g of aminonitrile compound solution obtained according to the same manner as in Synthesis Example 18 were charged and reaction was conducted at 60°–70° C. for 2 hours. Then, the reaction system was adjusted at pH 7 and a concentration of 50% with sulfuric acid and water to obtain a resin solution having a viscosity of 200 cps.

Synthesis Example 26–29

Synthesis Example 25 was repeated except that aqueous water soluble resin solution, its amount, aminonitrile compound and its amount were changed as described in Table 2 to obtain a resin solution. Viscosity and concentration of the resin solution is shown in Table 2-2.

TABLE 2

| | Water soluble resin solution | | Amino nitrile compound | |
|---|---|---|---|---|
| Synthesis Example No. | Synthesis Example No. | Amount (g) | Synthesis Example No. | Amount (g) |
| 25 | 4 | 450 | 18 | 36 |
| 26 | 4 | 350 | 21 | 107 |
| 27 | 5 | 425 | 19 | 18 |
| 28 | 6 | 450 | 20 | 43 |
| 29 | 7 | 450 | 22 | 43 |

TABLE 2-2

| Synthesis Example No. | Concentration of Resin solution (%) | Viscosity of Resin solution (cps) |
|---|---|---|
| 25 | 50 | 200 |
| 26 | 50 | 190 |
| 27 | 50 | 45 |
| 28 | 60 | 200 |
| 29 | 60 | 300 |

Referential Example 1

A master color having the formulation (solid base) described in the following Table 3 was prepared.

TABLE 3

| | Master Color | * |
|---|---|---|
| Pigment: | Ultrawhite 90[1] | 70 parts |
| | Carbital 90[2] | 30 parts |
| Dispersing Agent: | Sumirez Resin DS-10[3] | 0.2 part |
| Aqueous Binder: | SN-307[4] | 12 parts |
| | Oji Ace A[5] | 4 parts |

Note:
[1]: Clay produced by Engel Hard Minerals and Chemical Division Inc., U.S.A.
[2]: Calcium carbonate produced by Fuji Kaolin Co., Ltd., Japan
[3]: Polyacrylic acid type pigment dispersant produced by Sumitomo Chemical Co., Ltd., Japan
[4]: Styrene-butadiene latex produced by Sumitomo Naugatuck Co., Ltd., Japan
[5]: Oxidized starch produced by Oji National Co., Ltd., Japan
In the Table 3, Ratio is based on solid content.
*: Parts by weight of solid content.

EXAMPLE 1

Into 95 g of the aqueous, water soluble resin solution obtained in Synthesis Example 1, 7.5 g of amide compound solution obtained in Synthesis Example 8 and 1.4 g of water and the mixture was adjusted to pH 7 with sulfuric acid to obtain a resin solution having a viscosity of 190 cps and a concentration of 50%. The resin solution thus obtained was added to the master color prepared in Referential Example 1, the ratio of the solid content of the resin solution to the pigment being 0.5 to 100.

EXAMPLE 2–14

Example 1 was repeated except that the water soluble resin solution, amide compound solution and its amount are changed as shown in Table 4 to obtain a resin solution. Concentration, pH and viscosity of the resin solution obtained are shown in Table 4-2. The resin solution thus obtained was added to the master color prepared in Referential Example 1, the ratio of the solid content of the resin solution to the pigment being 0.5 to 100.

TABLE 4

| | Water soluble resin solution | Amide compound solution | |
|---|---|---|---|
| Example No. | Synthesis Example No. | Synthesis Example No. | Amount (%) * |
| 1 | 1 | 8 | 10 |
| 2 | 1 | 9 | 10 |
| 3 | 1 | 10 | 10 |
| 4 | 1 | 10 | 30 |
| 5 | 2 | 10 | 10 |
| 6 | 2 | 11 | 10 |
| 7 | 2 | 12 | 5 |
| 8 | 2 | 12 | 20 |
| 9 | 3 | 10 | 5 |
| 10 | 3 | 10 | 10 |
| 11 | 3 | 10 | 50 |
| 12 | 3 | 11 | 5 |
| 13 | 3 | 11 | 20 |
| 14 | 3 | 13 | 10 |

*Hereinafter in Tables "Amount of Amide compound" means: "(amount by weight of the Amide compound)/(total amount by weight of the Water soluble resin and the Amide compound) × 100". (calculated based on solid content)

TABLE 4-2

| | Resin solution | | |
|---|---|---|---|
| Example No. | Concentration (%) | pH | Viscosity (cps) |
| 1 | 50 | 7.0 | 180 |
| 2 | 50 | 7.1 | 170 |
| 3 | 50 | 7.2 | 190 |
| 4 | 50 | 7.0 | 210 |
| 5 | 50 | 7.0 | 52 |
| 6 | 50 | 7.1 | 49 |
| 7 | 50 | 7.0 | 46 |
| 8 | 50 | 7.0 | 51 |
| 9 | 60 | 6.8 | 230 |
| 10 | 60 | 7.0 | 250 |
| 11 | 60 | 7.1 | 350 |
| 12 | 60 | 6.9 | 220 |
| 13 | 60 | 7.2 | 260 |
| 14 | 60 | 6.9 | 230 |

EXAMPLE 15–18

The resin solution obtained in Synthesis Example 14–17 was added to the master color prepared in Referential Example 1, the ratio of the solid content of the resin solution to the pigment being 0.5 to 100.

EXAMPLE 19–22

Water soluble resin and amide compound used in each of Example 1, 5, 12 and 13 were added independently, i.e. without mixing them before adding, to the master color prepared in Referential Example 1. Ratio between them is shown in Table 7 and ratio of the total solid content of both to the pigment was 0.5 to 100.

The paper coating compositions prepared in Example 1–22 were adjusted so as to have a total solids content of 60% and a pH of about 9.0 with water and 10% aqueous sodium hydroxide solution. The physical properties of the thus prepared compositions were measured according to the following methods and the properties thus measured are shown in Table 5–7 bellow.

1) pH pH was measured by using a glass electrode hydrogen ion concentration meter manufactured by Toa Denpa Kogyo Co. Ltd. at 25° C. immediately after having prepared the composition.

2) Viscosity

Viscosity was measured by using a BL type viscometer manufactured by Tokyo Keiki Co. Ltd. at 60 rpm. and at 25° C. immediately after having prepared the composition.

The thus prepared composition was applied using a wire rod on one side of fine paper having a basis weight of 80 g/m² at a single spread of 14 g/m². The paper was immediately subjected to drying in hot air at 120° C. for 30 seconds, then to moisture-conditioning at 20° C. under a relative humidity of 65% for 16 hours, and, thereafter, to supercalendering twice at 60° C. and under a linear pressure of 60 kg/cm to obtain coated paper.

Water resistance and ink receptivity of the resulting coated paper were evaluated in accordance with the following test methods. The results obtained are shown in Table 5–7 below.

3) Water Resistance: (Wet Pick Method :WP)

The coated surface was wetted with a water-supply roll and printed by means of an RI tester (manufactured by Akira Seisakusho Co., Ltd.). The picking was visually observed to evaluate water resistance according to five ratings of from 1 (poor) to 5 (excellent).

4) Ink Receptivity:
4-1) Method A:

The coated surface was wetted with a water-supply roll and printed by means of the RI tester. Ink receptivity was visually evaluated according to five ratings of from 1 (poor) to 5 (excellent).

4-2) Method B:

Printing was carried out while incorporating water into ink by means of the RI tester. Ink receptivity was visually evaluated according to five ratings of from 1 (poor) to 5 (excellent).

TABLE 5

| Example No. | 1 | 2 | 3 | 4 | 5 | 6 | 7 |
|---|---|---|---|---|---|---|---|
| Water soluble resin (Synthesis example No.) | 1 | 1 | 1 | 1 | 2 | 2 | 2 |
| Amide compound (Synthesis example No.) | 8 | 9 | 10 | 10 | 10 | 11 | 12 |
| Amount of Amide compound(%) | 10 | 10 | 10 | 30 | 10 | 10 | 5 |
| Coating Composition Physical Properties: | | | | | | | |
| pH (25° C.) | 9.1 | 9.1 | 9.1 | 9.1 | 9.1 | 9.1 | 9.1 |
| Viscosity(25° C.) (cps) | 1720 | 1710 | 1720 | 1760 | 1760 | 1750 | 1740 |
| Coated Paper: | | | | | | | |
| Water resistance: | | | | | | | |
| WP method | 4.1 | 4.1 | 4.1 | 4.2 | 4.5 | 4.5 | 4.4 |
| Ink receptivity: | | | | | | | |
| Method A | 4.1 | 4.1 | 4.2 | 4.4 | 4.0 | 4.0 | 4.0 |
| Method B | 4.2 | 4.1 | 4.2 | 4.3 | 4.0 | 4.0 | 4.0 |

TABLE 6

| Example No. | 8 | 9 | 10 | 11 | 12 | 13 | 14 |
|---|---|---|---|---|---|---|---|
| Water soluble resin (Synthesis example No.) | 2 | 3 | 3 | 3 | 3 | 3 | 3 |
| Amide compound (Synthesis example No.) | 12 | 10 | 10 | 10 | 11 | 11 | 13 |
| Amount of Amide compound(%) | 20 | 5 | 10 | 50 | 5 | 20 | 10 |
| Coating Composition Physical Properties: | | | | | | | |
| pH (25° C.) | 9.1 | 9.0 | 9.1 | 9.1 | 9.0 | 9.1 | 9.0 |
| Viscosity(25° C.)(cps) | 1760 | 1670 | 1690 | 1850 | 1670 | 1700 | 1680 |
| Coated Paper: | | | | | | | |
| Water resistance: | | | | | | | |
| WP method | 4.5 | 4.1 | 4.2 | 4.3 | 4.1 | 4.2 | 4.2 |
| Ink receptivity: | | | | | | | |
| Method A | 4.1 | 4.1 | 4.2 | 4.5 | 4.1 | 4.3 | 4.2 |
| Method B | 4.1 | 4.2 | 4.3 | 4.5 | 4.2 | 4.4 | 4.3 |

TABLE 7

| Example No. | 15 | 16 | 17 | 18 | 19 | 20 | 21 | 22 |
|---|---|---|---|---|---|---|---|---|
| Water soluble resin (Synthesis example No.) | 1 | 3 | 2 | 3 | 1 | 2 | 3 | 3 |
| Amide compound | 8 | 10 | 12 | 11 | 5 | 10 | 11 | 11 |

TABLE 7-continued

| Example No. | 15 | 16 | 17 | 18 | 19 | 20 | 21 | 22 |
|---|---|---|---|---|---|---|---|---|
| (Synthesis example No.) Amount of Amide compound(%) | 25 | 20 | 30 | 5 | 10 | 10 | 5 | 20 |
| Coating Composition Physical Properties: | | | | | | | | |
| pH (25° C.) | 9.1 | 9.1 | 9.1 | 9.1 | 9.2 | 9.2 | 9.1 | 9.2 |
| Viscosity(25° C.)(cps) | 1760 | 1700 | 1800 | 1710 | 1720 | 1760 | 1670 | 1700 |
| Coated Paper: | | | | | | | | |
| Water resistance: | | | | | | | | |
| WP method | 4.2 | 4.3 | 4.5 | 4.1 | 4.1 | 4.5 | 4.1 | 4.2 |
| Ink receptivity: | | | | | | | | |
| Method A | 4.2 | 4.2 | 4.1 | 4.2 | 4.1 | 4.0 | 4.1 | 4.3 |
| Method B | 4.3 | 4.5 | 4.1 | 4.3 | 4.2 | 4.0 | 4.3 | 4.4 |

Comparative Example 1

Without using an amide compound solution, the water soluble resin solution obtained in Synthesis Example 1 was added to the master color prepared in Referential Example 1, the ratio of the solid content of the water soluble resin solution to the pigment being 0.5 to 100, to prepare a paper coating composition.

The physical properties of the thus prepared compositions were measured according to the same manner as in Example 1–22. Using the prepared compositions, coated papers were obtained and water resistance and ink receptivity of the resulting coated papers were evaluated according to the same manner as in Example 1–22.

Results are shown in Table 8.

Comparative Example 2–3

Comparative example 1 was repeated except that the water soluble resin solution was changed as shown in Table 8.

Results are shown in Table 8.

Comparative Example 4

Comparative example 1 was repeated except that the water soluble resin solution was not added to the master color prepared in Referential Example 1.

Results are shown in Table 8.

TABLE 8

| Comparative example No. | 1 | 2 | 3 | 4 |
|---|---|---|---|---|
| Water soluble resin (Synthesis example No.) | 1 | 2 | 3 | — |
| Coating Composition Physical Properties: | | | | |
| pH (25° C.) | 9.1 | 9.1 | 9.0 | 9.3 |
| Viscosity(25° C.) (cps) | 1710 | 1730 | 1660 | 1600 |
| Coated Paper: | | | | |
| Water resistance: | | | | |
| WP method | 3.0 | 4.0 | 3.0 | 1.0 |
| Ink receptivity: | | | | |
| Method A | 3.2 | 3.3 | 3.5 | 1.0 |
| Method B | 3.1 | 3.0 | 3.5 | 1.0 |

EXAMPLE 23

Into 95 g of the aqueous water soluble resin solution obtained in Synthesis Example 4, 7.5 g of aminonitrile compound solution obtained in Synthesis Example 7 and 1.4 g of water were charged. Then, the mixture was adjusted pH 7 with sulfuric acid to obtain a resin solution having a viscosity of 190 cps and a concentration of 50%. The resin solution thus obtained was added to the master color prepared in Referential Example 1, the ratio of the solid content of the resin solution to the pigment being 0.5 to 100.

EXAMPLE 24–36

Example 23 was repeated except that water soluble resin solution, aminonitrile compound solution and its amount are changed as shown in Table 9 to obtain resin solution. Concentration and viscosity of the resin solution thus obtained are shown in Table 9-2. The resin solution thus obtained was added to the master color prepared in Referential Example 1, the ratio of the solid content of the resin solution to the pigment being 0.5 to 100.

TABLE 9

| Example No. | Water soluble resin Synthesis Example No. | Amino nitrile compound Synthesis Example No. | Amount (%) * |
|---|---|---|---|
| 23 | 4 | 18 | 5 |
| 24 | 4 | 18 | 20 |
| 25 | 4 | 19 | 10 |
| 26 | 4 | 20 | 20 |
| 27 | 5 | 18 | 10 |
| 28 | 5 | 19 | 20 |
| 29 | 5 | 22 | 5 |
| 30 | 5 | 23 | 20 |
| 31 | 6 | 20 | 30 |
| 32 | 6 | 20 | 5 |
| 33 | 6 | 21 | 50 |
| 34 | 6 | 22 | 15 |
| 35 | 6 | 24 | 25 |
| 36 | 7 | 24 | 10 |

*Hereinafter in Tables "Amount of Aminonitrile compound" means "(amount by weight of the Aminonitrile compound)/(total amount by weight of the Water soluble resin and the Aminonitrile compound) × 100". (calculated based on solid content)

TABLE 9-2

| Reference Example No. | Resin solution Concentration (%) | Viscosity (cps) |
|---|---|---|
| 23 | 50 | 150 |
| 24 | 50 | 130 |
| 25 | 50 | 135 |
| 26 | 50 | 130 |
| 27 | 50 | 45 |
| 28 | 50 | 45 |
| 29 | 50 | 45 |
| 30 | 50 | 40 |
| 31 | 60 | 180 |
| 32 | 60 | 210 |
| 33 | 60 | 190 |
| 34 | 60 | 205 |
| 35 | 60 | 195 |
| 36 | 60 | 315 |

EXAMPLE 37–41

The resin solution obtained in Synthesis Example 25–29 was added to the master color prepared in Referential Example 1, the ratio of the solid content of the resin solution to the pigment being 0.5 to 100.

EXAMPLE 42–46

The water soluble resin solution and aminonitrile compound solution used in each of Example 23, 29, 31, 33 and 36 were added independently, i.e. without mixing them before adding, to the master color prepared in Referential Example 1. Ratio between them is shown in Table and ratio of the solid content of total of them to the pigment is 0.5 to 100.

The paper coating compositions prepared in Example 23–46 were adjusted so as to have a total solids content of 60% and a pH of about 9.0 with water and 10% aqueous sodium hydroxide solution. The physical properties of the thus prepared compositions were measured according to the same manner as in Example 1–22.

Results are shown in Table 10–12

The thus prepared composition was applied using a wire rod on one side of fine paper having a basis weight of 80 g/m$^2$ at a single spread of 14 g/m$^2$. The paper was immediately subjected to drying in hot air at 120° C. for 30 seconds, then to moisture-conditioning at 20° C. under a relative humidity of 65% for 16 hours, and, thereafter, to supercalendering twice at 60° C. and under a linear pressure of 60 kg/cm to obtain coated paper.

Water resistance and ink receptivity of the resulting coated paper were evaluated according to the same manner as in Example 1–22.

Results are shown in Table 10–12.

TABLE 10

| Example No. | 23 | 24 | 25 | 26 | 27 | 28 | 29 | 30 |
|---|---|---|---|---|---|---|---|---|
| Water soluble resin (Synthesis example No.) | 4 | 4 | 4 | 4 | 5 | 5 | 5 | 5 |
| Amino nitrile compound (Synthesis example No.) | 18 | 18 | 19 | 20 | 18 | 19 | 22 | 23 |
| Amount of Amino nitrile compound(%) | 5 | 20 | 10 | 20 | 10 | 20 | 5 | 20 |
| Coating Composition Physical Properties: | | | | | | | | |
| pH (25° C.) | 9.1 | 9.1 | 9.1 | 9.1 | 9.1 | 9.1 | 9.1 | 9.1 |
| Viscosity(25° C.)(cps) | 1710 | 1720 | 1710 | 1720 | 1740 | 1760 | 1740 | 1750 |
| Coated Paper: | | | | | | | | |
| Water resistance: | | | | | | | | |
| WP method | 4.0 | 4.1 | 4.1 | 4.2 | 4.4 | 4.5 | 4.4 | 4.5 |
| Ink receptivity: | | | | | | | | |
| Method A | 4.0 | 4.2 | 4.1 | 4.3 | 4.1 | 4.1 | 4.1 | 4.1 |
| Method B | 4.0 | 4.1 | 4.1 | 4.2 | 4.0 | 4.0 | 4.0 | 4.0 |

TABLE 11

| Example No. | 31 | 32 | 33 | 34 | 35 | 36 | 37 | 38 |
|---|---|---|---|---|---|---|---|---|
| Water soluble resin (Synthesis example No.) | 6 | 6 | 6 | 6 | 6 | 7 | 4 | 4 |
| Amino nitrile compound (Synthesis example No.) | 20 | 20 | 21 | 22 | 24 | 24 | 18 | 21 |

TABLE 11-continued

| Example No. | 31 | 32 | 33 | 34 | 35 | 36 | 37 | 38 |
|---|---|---|---|---|---|---|---|---|
| Amount of Amino nitrile compound(%) | 30 | 5 | 50 | 15 | 25 | 10 | 10 | 30 |
| Coating Composition Physical Properties: | | | | | | | | |
| pH (25° C.) | 9.0 | 9.1 | 9.1 | 9.0 | 9.1 | 9.0 | 9.1 | 9.1 |
| Viscosity(25° C.)(cps) | 1690 | 1660 | 1850 | 1670 | 1690 | 1710 | 1720 | 1750 |
| Coated Paper: | | | | | | | | |
| Water resistance: | | | | | | | | |
| WP method | 4.2 | 4.0 | 4.3 | 4.1 | 4.2 | 4.2 | 4.2 | 4.3 |
| Ink receptivity: | | | | | | | | |
| Method A | 4.2 | 4.1 | 4.5 | 4.1 | 4.3 | 4.2 | 4.2 | 4.2 |
| Method B | 4.3 | 4.2 | 4.5 | 4.2 | 4.4 | 4.2 | 4.3 | 4.5 |

TABLE 12

| Example No. | 39 | 40 | 41 | 42 | 43 | 44 | 45 | 46 |
|---|---|---|---|---|---|---|---|---|
| Water soluble resin (Synthesis example No.) | 5 | 6 | 7 | 4 | 5 | 6 | 6 | 7 |
| Amino nitrile compound (Synthesis example No.) | 19 | 20 | 22 | 18 | 22 | 20 | 21 | 24 |
| Amount of Amino nitrile compound(%) | 15 | 10 | 10 | 5 | 5 | 30 | 50 | 10 |
| Coating Composition Physical Properties: | | | | | | | | |
| pH (25° C.) | 9.1 | 9.1 | 9.2 | 9.2 | 9.1 | 9.0 | 9.1 | 9.0 |
| Viscosity(25° C.)(cps) | 1780 | 1710 | 1720 | 1710 | 1740 | 1690 | 1850 | 1710 |
| Coated Paper: | | | | | | | | |
| Water resistance: | | | | | | | | |
| WP method | 4.5 | 4.1 | 4.2 | 4.0 | 4.4 | 4.2 | 4.3 | 4.2 |
| Ink receptivity: | | | | | | | | |
| Method A | 4.1 | 4.4 | 4.1 | 4.0 | 4.1 | 4.2 | 4.5 | 4.2 |
| Method B | 4.1 | 4.4 | 4.2 | 4.0 | 4.0 | 4.3 | 4.5 | 4.2 |

Comparative Example 5

Without using an aminonitrile compound solution, the water soluble resin solution obtained in Synthesis Example 4 was added to the master color prepared in Referential Example 1, the ratio of the solid content of the resin to the pigment being 0.5 to 100, to prepare a paper coating composition.

The physical properties of the thus prepared compositions were measured according to the same manner as in Example 1–22. Using the prepared compositions, coated paper were obtained and water resistance and ink receptivity of the resulting coated papers were evaluated according to the same manner as in Example 1–22.

Comparative Example 6–8

Comparative example 5 was repeated except that water soluble resin solution was changed as shown in Table 13.

Comparative Example 9

(same condition as Comparative example 4)

Comparative example 5 was repeated except that water soluble resin solution was not added to the master color prepared in Referential Example 1.

Results of Comparative examples 5–9 are shown in Table 13.

TABLE 13

| Comparative example No. | 5 | 6 | 7 | 8 | 9 |
|---|---|---|---|---|---|
| Water soluble resin (Synthesis example No.) | 4 | 5 | 6 | 7 | — |
| Coating Composition Physical Properties: | | | | | |
| pH (25° C.) | 9.1 | 9.1 | 9.0 | 9.1 | 9.0 |
| Viscosity(25° C.) (cps) | 1710 | 1730 | 1660 | 1720 | 1600 |
| Coated Paper: | | | | | |
| Water resistance: | | | | | |
| WP method | 3.0 | 4.0 | 3.0 | 3.5 | 1.0 |
| Ink receptivity: | | | | | |
| Method A | 3.2 | 3.3 | 3.5 | 3.5 | 1.0 |
| Method B | 3.1 | 3.0 | 3.5 | 3.5 | 1.0 |

The coated paper obtained by using the paper coating composition of the present invention has various excellent properties, such as ink receptivity, water resistance, etc.

What is claimed is:

1. A paper coating composition which comprises:
   (I) a pigment;
   (II) an aqueous binder;
   (III) a mixture or a reaction product of
      a water-soluble resin (A) which is obtained by reacting, at least, (a) an alkylenediamine or a polyalkylenepolyamine, (b) an urea compound and (c) a compound selected from aldehydes, epihalohydrins and $\alpha,\gamma$-dihalo-$\beta$-hydrins; and
      an amide compound (B-1) which is obtained by reacting (x) an $\alpha,\beta$-unsaturated carboxylic acid compound and (y) a primary or secondary amino compound, or
      an aminonitrile compound (B-2) which is obtained by reacting (z) an $\alpha,\beta$-unsaturated nitril compound and (y) a primary or secondary amino compound.

2. A composition according to claim 1, wherein the ingredient (III) is a mixture of (A) and (B-1) or (B-2).

3. A composition according to claim 1, wherein the ingredient (III) is a reaction product of (A) and (B-1) or (B-2).

4. A composition according to claim 1, wherein the water-soluble resin (A) is obtained by reacting
   (a) an alkylenediamine or a polyalkylenepolyamine,
   (b) an urea compound,
   (c) a compound selected from aldehydes, epihalohydrins and $\alpha,\gamma$-dihalo-$\beta$-hydrins, and
   (d) a divalent carboxylic compound.

5. A composition according to claim 4, wherein the divalent carboxylic compound (d) is a free acid, an ester or an acid anhydride thereof.

6. A composition according to claim 1, wherein the water-soluble resin (A) is obtained by reacting
   (a) an alkylenediamine or a polyalkylenepolyamine,
   (b) an urea compound,
   (c) a compound selected from aldehydes, epihalohydrins and $\alpha,\gamma$-dihalo-$\beta$-hydrins, and
   (e) an alicyclic compound selected from an alicyclic amines having at least one active hydrogen atom and an epoxy compound.

7. A composition according to claim 1, wherein the water-soluble resin (A) is obtained by reacting
   (a) an alkylenediamine or a polyalkylenepolyamine,
   (b) an urea compound,
   (c) a compound selected from aldehydes, epihalohydrins and $\alpha,\gamma$-dihalo-$\beta$-hydrins,
   (d) a divalent carboxylic compound, and
   (e) an alicyclic compound selected from an alicyclic amines having at least one active hydrogen atom and an epoxy compound.

8. A composition according to claim 1, wherein the amide compound (B-1) is used and the amide compound is obtained by reacting (x) an $\alpha,\beta$-unsaturated carboxylic acid compound and (y) an alicyclic amino compound having ay least one primary or secondary amino group.

9. A composition according to claim 1, wherein the amide compound (B-1) is used and the amide compound (B-1) is obtained by reacting (x) an $\alpha,\beta$-unsaturated carboxylic acid compound and (y) an aromatic amino compound having ay least one primary or secondary amino group.

10. A composition according to claim 1, wherein the aminonitrile compound (B-2) is used and the aminonitrile compound is obtained by reacting (z) an $\alpha,\beta$-unsaturated nitrile compound and (y) a di- or polyamine compound having ay least two primary or secondary amino groups.

* * * * *